United States Patent
Kang et al.

(10) Patent No.: US 9,664,135 B2
(45) Date of Patent: May 30, 2017

(54) METHOD AND APPARATUS FOR CONTROLLING OPERATION OF AN INTERNAL COMBUSTION ENGINE OPERATING IN HCCI COMBUSTION MODE

(71) Applicant: GM GLOBAL TECHNOLOGY OPERATIONS LLC, Detroit, MI (US)

(72) Inventors: Jun-Mo Kang, Ann Arbor, MI (US); Sai S. V. Rajagopalan, Sterling Heights, MI (US); Hanho Yun, Oakland Township, MI (US); Orgun A. Guralp, Ann Arbor, MI (US); Ethan E. Bayer, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 202 days.

(21) Appl. No.: 14/735,547

(22) Filed: Jun. 10, 2015

(65) Prior Publication Data

US 2015/0361916 A1 Dec. 17, 2015

Related U.S. Application Data

(60) Provisional application No. 62/011,895, filed on Jun. 13, 2014.

(51) Int. Cl.
  *F02M 25/07* (2006.01)
  *F02D 41/30* (2006.01)
  (Continued)

(52) U.S. Cl.
  CPC ............ *F02D 41/3035* (2013.01); *F02B 1/12* (2013.01); *F02D 13/0211* (2013.01); *F02D 13/0219* (2013.01); *F02D 13/0261* (2013.01); *F02D 35/023* (2013.01); *F02D 41/0002* (2013.01); *F02D 41/0062* (2013.01); *F02D 41/3064* (2013.01); *F01L 13/0015* (2013.01); *F01L 2001/34493* (2013.01);
  (Continued)

(58) Field of Classification Search
  CPC .............. F01L 2001/0537; F01L 1/344; F01L 2001/34493; F01L 13/0015; F01L 2800/10; F02D 41/006; F02D 41/0062; F02D 41/3029; F02D 41/3035; F02D 41/3064; F02D 2200/0614; F02D 2200/0616; F02M 26/01
  USPC ................. 123/90.17, 295, 520, 568.14, 698
  See application file for complete search history.

(56) References Cited

U.S. PATENT DOCUMENTS

| | | | |
|---|---|---|---|
| 2004/0139949 A1* | 7/2004 | Koseki ...................... | F01L 1/20 123/568.14 |
| 2010/0274463 A1* | 10/2010 | Itoga ................... | F02D 13/0246 701/102 |
| 2013/0073185 A1* | 3/2013 | Hellstrom ............. | F02D 35/025 701/104 |

* cited by examiner

Primary Examiner — Jorge Leon, Jr.
(74) Attorney, Agent, or Firm — Quinn IP Law

(57) ABSTRACT

An internal combustion engine is configured to operate in a homogeneous-charge compression-ignition combustion mode and a spark-ignition combustion mode employing late intake valve closing. A method for operating the internal combustion engine includes determining an amount of residual gas re-inducted into a combustion chamber from a previous engine cycle and determining an amount of fresh air trapped in the combustion chamber for the present engine cycle based upon the amount of residual gas re-inducted into the combustion chamber from the previous engine cycle. Engine fueling to the cylinder for the present engine cycle is controlled based upon the amount of fresh air trapped in the combustion chamber for the present engine cycle.

12 Claims, 4 Drawing Sheets

(51) Int. Cl.
   *F02B 1/12*     (2006.01)
   *F02D 41/00*    (2006.01)
   *F02D 35/02*    (2006.01)
   *F02D 13/02*    (2006.01)
   *F01L 1/344*        (2006.01)
   *F02M 26/01*        (2016.01)
   *F01L 13/00*        (2006.01)
   *F02B 23/10*        (2006.01)

(52) U.S. Cl.
   CPC ......... *F01L 2800/10* (2013.01); *F02B 23/104* (2013.01); *F02D 41/3029* (2013.01); *F02D 2041/001* (2013.01); *F02D 2200/0411* (2013.01); *F02D 2200/0616* (2013.01); *F02M 26/01* (2016.02); *Y02T 10/128* (2013.01); *Y02T 10/18* (2013.01); *Y02T 10/42* (2013.01); *Y02T 10/47* (2013.01)

METHOD AND APPARATUS FOR CONTROLLING OPERATION OF AN INTERNAL COMBUSTION ENGINE OPERATING IN HCCI COMBUSTION MODE

CROSS-REFERENCE TO RELATED APPLICATIONS

This application claims the benefit of U.S. Provisional Application No. 62/011,895, filed Jun. 13, 2014, which is hereby incorporated by reference in its entirety.

TECHNICAL FIELD

This disclosure relates to an internal combustion engine configured to operate in a homogeneous-charge compression-ignition (HCCI) combustion mode.

BACKGROUND

The statements in this section merely provide background information related to the present disclosure and may not constitute prior art.

Known spark-ignition (SI) engines introduce an air-fuel mixture into each cylinder that is compressed in a compression stroke and ignited by a spark plug. Known compression-ignition (CI) engines inject pressurized fuel into a combustion cylinder near top dead center (TDC) of the compression stroke that ignites upon injection. Combustion for both SI engines and CI engines involves premixed or diffusion flames controlled by fluid mechanics.

SI engines may operate in different combustion modes, including a homogeneous SI combustion mode and a stratified-charge SI combustion mode. SI engines may be configured to operate in a homogeneous-charge compression-ignition (HCCI) combustion mode, also referred to as controlled auto-ignition combustion, under predetermined speed/load operating conditions. HCCI combustion is a distributed, flameless, kinetically-controlled auto-ignition combustion process with the engine operating at a dilute air-fuel mixture, i.e., lean of a stoichiometric air/fuel point, with relatively low peak combustion temperatures, resulting in low NOx emissions. An engine operating in the HCCI combustion mode has a cylinder charge that is preferably homogeneous in composition, temperature, and residual exhaust gases at intake valve closing time. The homogeneous air-fuel mixture minimizes occurrences of rich in-cylinder combustion zones that form particulate matter.

Engine airflow may be controlled by selectively adjusting position of the throttle valve and opening and closing of intake valves and exhaust valves. On engine systems so equipped, opening and closing of the intake valves and exhaust valves may be adjusted using a variable valve actuation system that includes variable cam phasing and a selectable multi-step valve lift, e.g., multiple-step cam lobes that provide two or more valve lift positions. In contrast to the throttle position change, the change in valve position of the multi-step valve lift mechanism is a discrete step change.

When an engine operates in a HCCI combustion mode, the engine operates at a lean or stoichiometric air/fuel ratio operation with the throttle wide open to minimize engine pumping losses. When the engine operates in the SI combustion mode, the engine operates at or near stoichiometric air/fuel ratio, with the throttle valve controlled over a range of positions from 0% to 100% of the wide-open position to control intake airflow to achieve the stoichiometric air/fuel ratio.

Combustion during engine operation in the HCCI combustion mode is affected by cylinder charge gas temperature before and during compression prior to ignition and by mixture composition of a cylinder charge. Known engines operating in auto-ignition combustion modes account for variations in ambient and engine operating conditions using calibration tables as part of an overall engine control scheme. Known HCCI engine control schemes include calibrations for controlling engine parameters using input parameters including, e.g., engine load, engine speed and engine coolant temperature. Cylinder charge gas temperatures may be affected by controlling hot gas residuals via engine valve overlap and controlling cold gas residuals via exhaust gas recirculation. Cylinder charge gas temperatures, pressure, composition may be influenced by engine environment factors, including, e.g., air temperature, humidity, altitude, and fuel parameters, e.g., RVP, energy content, and quality.

Combustion during engine operation in the HCCI combustion mode may be characterized in terms of combustion heat release, which may include combustion timing relative to piston position. Combustion timing may be described in terms of a mass-burn-fraction, which indicates a piston position at which a portion of the mass fraction of a cylinder charge is burned. A mass-burn-fraction of interest includes a CA50 point (in crank angle relative to TDC) at which an accumulated heat release reaches 50% of a total heat release of a cylinder charge.

The airflow control strategy changes in accordance with the combustion mode chosen, necessitating a change in position of slow and fast actuators in the system. An HCCI engine equipped with a cam phaser and a variable valve lift system, such as a two-step valve profile switcher, operates with the high-lift valve profile in SI mode and the low-lift valve profile in HCCI mode. This reduces pumping losses significantly in low and part load conditions. Because the engine is operated with wide-open throttle position in HCCI mode, cylinder air charge is controlled through cam phasing, by changing the intake and exhaust valve timings and thereby adjusting the effective cylinder volume at intake valve closing (IVC), while cylinder air charge is primarily controlled using the throttle to change intake manifold pressure in SI mode. Valve profiles and timings and intake manifold pressure associated with operation in the SI mode and the HCCI mode are substantially different for a constant engine load, increasing a likelihood of noticeable torque deviation and associated drivability penalties absent a suitable engine control strategy to mitigate such torque deviation.

SUMMARY

An internal combustion engine is configured to operate in a homogeneous-charge compression-ignition combustion mode and a spark-ignition combustion mode employing late intake valve closing. A method for operating the internal combustion engine includes determining an amount of residual gas re-inducted into a combustion chamber from a previous engine cycle and determining an amount of fresh air trapped in the combustion chamber for the present engine cycle based upon the amount of residual gas re-inducted into the combustion chamber from the previous engine cycle. Engine fueling to the cylinder for the present engine cycle is controlled based upon the amount of fresh air trapped in the combustion chamber for the present engine cycle.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
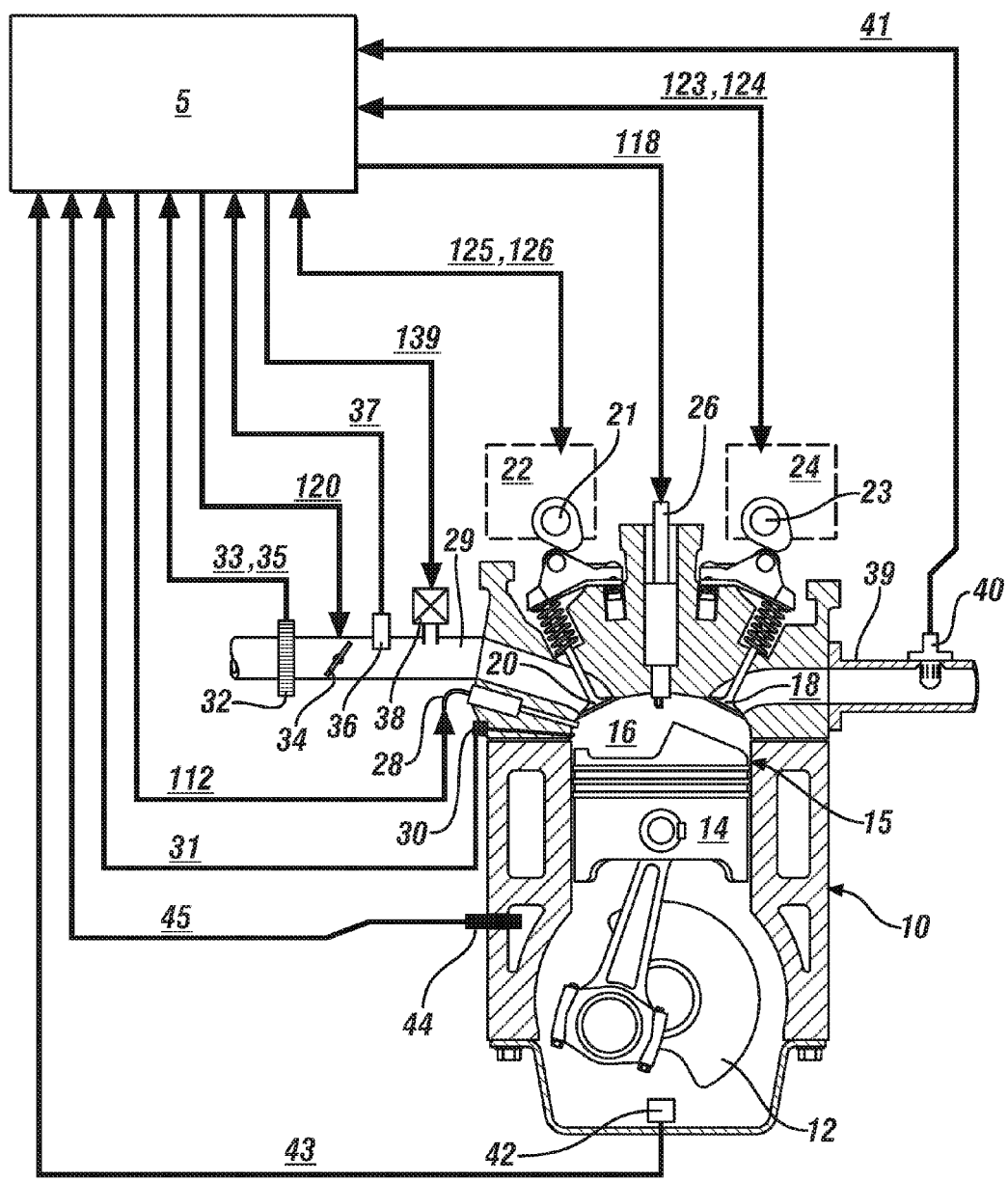
FIG. 1 schematically illustrates a cross-sectional view of a spark-ignition internal combustion engine configured to operate in controlled auto-ignition (HCCI) combustion mode and an accompanying controller in accordance with the present disclosure.

Referring now to the drawings, wherein the depictions are for the purpose of illustrating certain exemplary embodiments only and not for the purpose of limiting the same, FIG. 1 schematically illustrates a cross-sectional view of an internal combustion engine 10 with an accompanying controller 5 that have been constructed in accordance with an embodiment of this disclosure. The engine 10 operates in one of a plurality of selectable combustion modes, including a homogeneous-charge compression-ignition (HCCI) combustion mode and a spark-ignition (SI) combustion mode. The engine 10 is configured to operate at a stoichiometric air/fuel ratio and at an air/fuel ratio that is primarily lean of stoichiometry. The disclosure may be applied to various internal combustion engine systems and combustion cycles.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system has airflow ductwork and devices for monitoring and controlling the airflow. The air intake devices preferably include a mass airflow sensor 32 for monitoring mass airflow (MAF) 33 and intake air temperature (IAT) 35. A throttle valve 34 preferably includes an electronically controlled device that is used to control airflow to the engine 10 in response to a control signal (ETC) 120 from the controller 5. A pressure sensor 36 in the intake manifold 29 is configured to monitor manifold absolute pressure (MAP) 37 and barometric pressure. An external flow passage recirculates exhaust gases from engine exhaust to the intake manifold 29, having a flow control valve referred to as an exhaust gas recirculation (EGR) valve 38. The controller 5 controls mass flow of exhaust gas to the intake manifold 29 by controlling opening of the EGR valve 38 via EGR command (EGR) 139.

Airflow from the intake manifold 29 into the combustion chamber 16 is controlled by one or more intake valve(s) 20 interacting with an intake camshaft 21 that rotationally couples to the crankshaft 12. Exhaust flow out of the combustion chamber 16 to an exhaust manifold 39 is controlled by one or more exhaust valve(s) 18 interacting with an exhaust camshaft 23 that rotationally couples to the crankshaft 12. The engine 10 is equipped with systems to control and adjust openings and closings of the intake and exhaust valves 20 and 18. In one embodiment, the openings and closings of the intake and exhaust valves 20 and 18 may be controlled and adjusted by controlling intake and exhaust variable cam phasing/variable lift control (VCP/VLC) devices 22 and 24 respectively. The intake and exhaust VCP/VLC devices 22 and 24 are configured to control and operate the intake camshaft 21 and the exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift of the intake valve(s) 20 in response to a control signal (iVLC) 125 and variably adjust and control phasing of the intake camshaft 21 for each cylinder 15 in response to a control signal (iVCP) 126. The exhaust VCP/VLC device 24 preferably includes a controllable mechanism operative to variably switch and control valve lift of the exhaust valve(s) 18 in response to a control signal (eVLC) 123 and variably adjust and control phasing of the exhaust camshaft 23 for each cylinder 15 in response to a control signal (eVCP) 124.

The intake and exhaust VCP/VLC devices 22 and 24 each preferably includes a controllable two-step VLC mechanism operative to control the magnitude of valve lift, or opening, of the intake and exhaust valve(s) 20 and 18, respectively, to one of two discrete steps. The two discrete steps preferably include a low-lift valve open position (about 4-6 mm in one embodiment) preferably for low speed, low load operation, and a high-lift valve open position (about 8-13 mm in one embodiment) preferably for high speed and high load operation. The intake and exhaust VCP/VLC devices 22 and 24 each preferably includes a variable cam phasing mechanism to control and adjust phasing (i.e., relative timing) of opening and closing of the intake valve(s) 20 and the exhaust valve(s) 18 respectively. Adjusting phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the controller 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, in response to the respective control signals eVLC 123, eVCP 124, iVLC 125, and iVCP 126.

The engine 10 employs a direct-injection fuel injection system including a plurality of high-pressure fuel injectors 28 that are configured to directly inject a mass of fuel into one of the combustion chambers 16 in response to an injector pulsewidth command (INJ_PW) 112 from the controller 5. The fuel injectors 28 are supplied pressurized fuel from a fuel distribution system. The engine 10 employs a spark-ignition system by which spark energy may be provided to a spark plug 26 for igniting or assisting in igniting cylinder charges in each of the combustion chambers 16 in response to a spark command (IGN) 118 from the controller 5.

The engine 10 is equipped with various sensing devices for monitoring engine operation, including a crank sensor 42 having an output indicative of crankshaft rotational position, i.e., crank angle and speed (RPM) 43. A temperature sensor 44 is configured to monitor coolant temperature 45. An in-cylinder combustion sensor 30 is configured to monitor combustion, and is a cylinder pressure sensor operative to monitor in-cylinder combustion pressure 31 in one embodiment. An exhaust gas sensor 40 is configured to monitor an exhaust gas parameter 41, e.g., air/fuel ratio (AFR). The combustion pressure 31 and the RPM 43 are monitored by the controller 5 to determine combustion timing, i.e., timing of combustion pressure relative to the crank angle of the crankshaft 12 for each cylinder 15 for each combustion cycle. It is appreciated that combustion timing may be determined by other methods. The combustion pressure 31 may be monitored by the controller 5 to determine an indicated mean effective pressure (IMEP) for each cylinder 15 for each combustion cycle. Preferably, the engine 10 and controller 5 are configured to monitor and determine states of IMEP for each of the engine cylinders 15 during each cylinder firing event. Alternatively, other sensing systems may be used to monitor states of other combustion parameters within the scope of the disclosure, e.g., ion-sense ignition systems, EGR fractions, and non-intrusive cylinder pressure sensors.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of a triggering event. Communications between controllers and between controllers, actuators and/or sensors may be accomplished using a direct wired link, a networked communications bus link, a wireless link or any another suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

During engine operation in the spark-ignition combustion (SI) mode, the throttle valve 34 may be controlled to regulate the airflow. The engine 10 may be controlled to a stoichiometric air/fuel ratio with the intake and exhaust valves 20 and 18 in the high-lift valve open position and the intake and exhaust lift timing operating with a positive valve overlap. Preferably, a fuel injection event is executed during intake or compression phase of an engine cycle, preferably substantially before TDC. Spark-ignition is preferably discharged at a predetermined time subsequent to the fuel injection when air charge within the cylinder is substantially homogeneous.

The controller 5 transitions engine operation to a preferred combustion mode associated with operating the engine 10 in the HCCI combustion mode or the SI combustion mode to increase fuel efficiencies and engine stability, and/or decrease emissions in response to the operator torque request. A change in one of the engine parameters, e.g., speed or load, may effect a change in a preferred combustion mode.

When the engine 10 is operating in the HCCI combustion mode, combustion and combustion timing may be described in the context of combustion heat release during a cylinder event, e.g., a magnitude and timing of combustion heat release during cylinder events. The magnitude and timing of the combustion heat release may be indicated by cylinder pressure, a mass-burn-fraction or other parameters.

Figure 2:
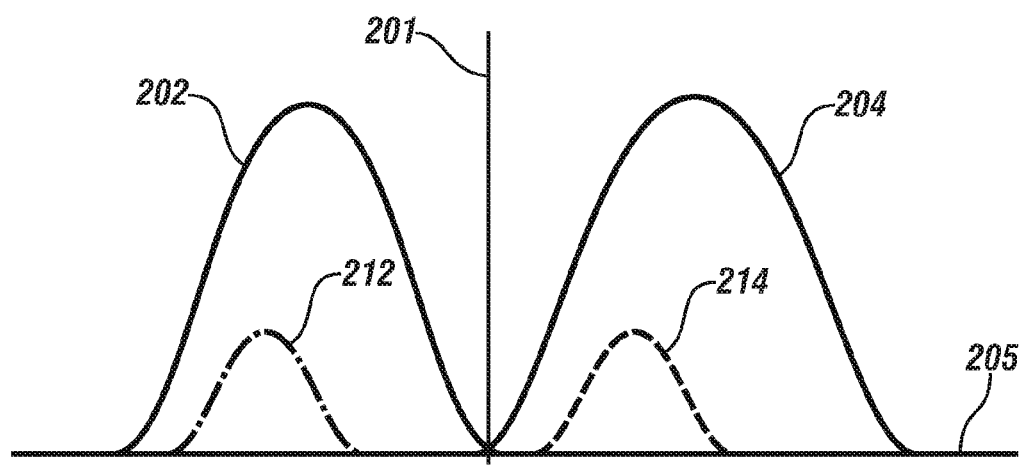
FIG. 2 graphically shows valve profiles for an embodiment of the engine described in FIG. 1 including a high-lift exhaust valve profile in the SI combustion mode, a high-lift intake valve profile in the SI combustion mode with the engine operating in a late intake valve closing (LIVC) mode, a low-lift exhaust valve profile in the HCCI combustion mode and a low-lift intake valve profile in the HCCI combustion mode, in accordance with the present disclosure.

FIG. 2 graphically shows valve profiles for an embodiment of the engine 10 described in FIG. 1 including a high-lift exhaust valve profile 202 associated with operating in the SI combustion mode, a high-lift intake valve profile 204 associated with operating in the SI combustion mode with the engine 10 operating in a late intake valve closing (LIVC) mode, a low-lift exhaust valve profile 212 associated with operating in the HCCI combustion mode 212 and a low-lift intake valve profile 214 associated with operating in the HCCI combustion mode 214, all shown in context of valve lift on a vertical axis 201 in relation to valve timing relative to cylinder top-dead-center (TDC) and cylinder bottom-dead-center (BDC) on the horizontal axis 205. Intake valve closing (IVC) in the SI combustion mode operating with LIVC is also shown. The LIVC mode includes aligning the intake and exhaust two-step valve profiles with the high-lift intake valve profile shifted more than that of a conventional SI engine such that the intake valve 20 closes much later than bottom-dead-center (BDC) when the engine 10 is operating in the SI mode. Therefore, the intake valve 20 is open while the piston 14 is still moving toward TDC, thus permitting significant backflow of cylinder constituents into the intake port during operation in the SI mode. The valve timing associated with operating in the LIVC mode can be used to adjust engine pushback and in-cylinder trapped charge content, thereby reducing or negating a need for engine throttling. Significant intake backflow is caused by the upward motion of the piston 14 while the intake valve 20 is still open.

When operating the engine 10 with the high-lift intake valve profile in the SI combustion mode, the intake backflow includes not only air, but also a portion of residual exhaust gas mass from the previous engine cycle and a portion of the fuel mass injected in the cylinder 15. The mass pushed to the intake port by the piston 14 is re-inducted during the next engine intake cycle, and thus a portion of cylinder gas volume is always occupied by the re-inducted mass except for the first cycle following a transition into SI mode.

Figure 3:
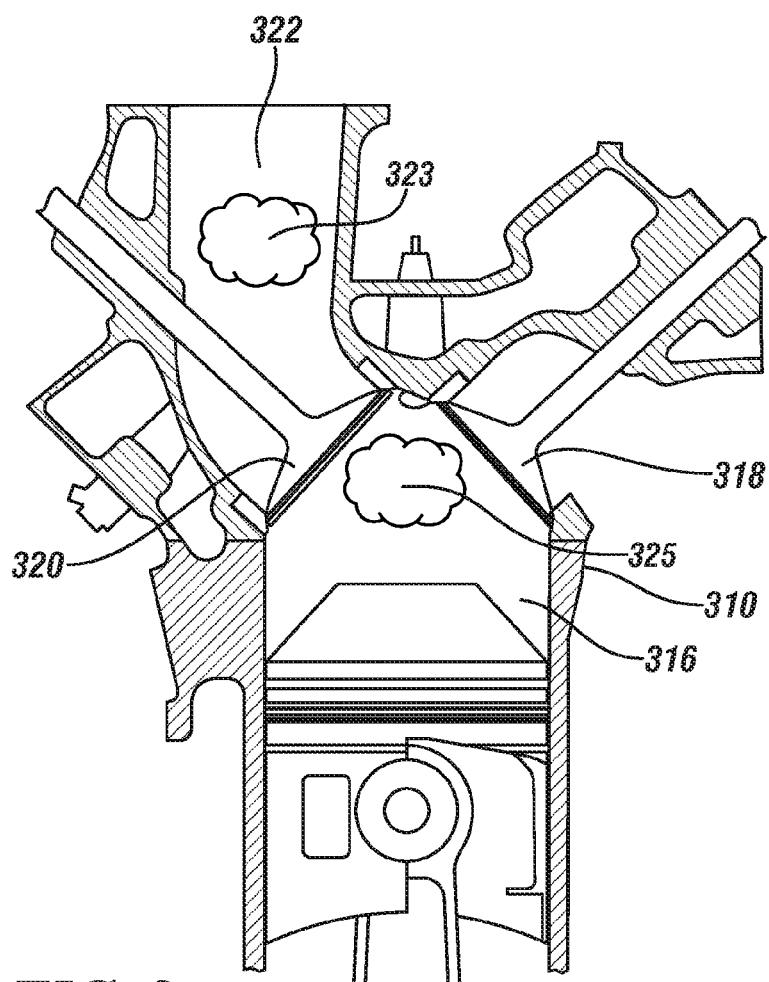
FIG. 3 schematically illustrates a cross-sectional single cylinder for an engine including an intake valve and an exhaust valve, and indicates that a portion of the residual gases are pushed back upstream of the intake valve and a portion of the residual gases are trapped in cylinder when both the exhaust and intake valves are closed in the SI combustion mode with the engine operating in LIVC mode, in accordance with the present disclosure.

FIG. 3 schematically illustrates a single cylinder for an exemplary engine 310 including an intake valve 320 and an exhaust valve 318, wherein the engine 310 is an embodiment of the engine 10 described with reference to FIG. 1. FIG. 3 indicates that a first portion 323 of the exhaust gases are pushed back upstream of the intake valve 320 into an intake runner 322 and a second portion 325 of the exhaust gases are trapped in the engine cylinder 316 when both the exhaust valve 318 and the intake valve 320 are closed in the SI combustion mode with the engine operating in LIVC mode. Thus, a portion of the cylinder volume can be occupied by the re-inducted mass in the first cycle following a transition into HCCI mode. Keeping track of residual gas volume that is pushed back into the intake port 322 and re-inducted into the cylinder 316 over subsequent engine cycles is required to precisely estimate a volumetric amount of fresh air trapped in the cylinder 316 for a present engine cycle. This is necessary to accurately meter fuel to achieve a commanded air/fuel ratio during a transition in combustion modes between the SI mode and the HCCI mode.

Figure 4:
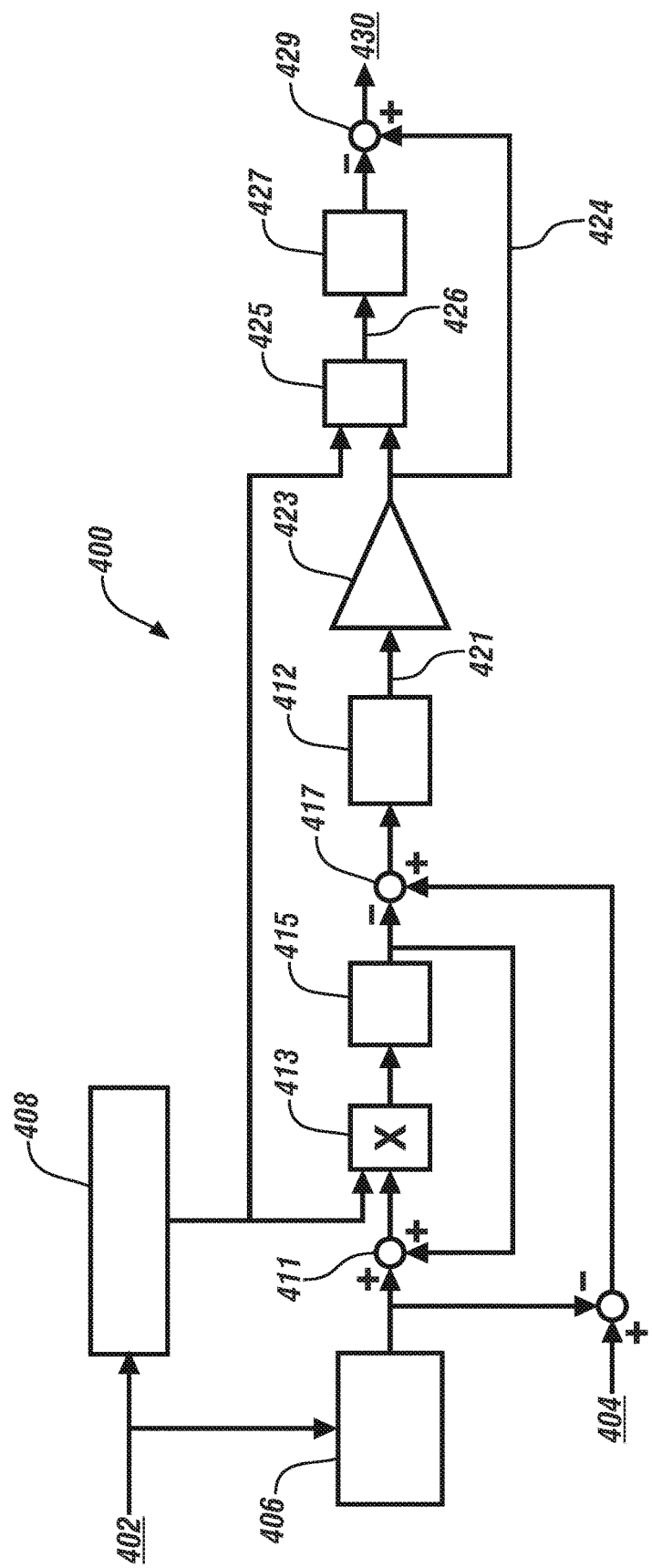
FIG. 4 schematically shows an embodiment of a feed-forward dynamic control routine to estimate re-inducted residual gases and to determine engine fueling based thereon, in accordance with the present disclosure.

FIG. 4 schematically shows an embodiment of a feed-forward dynamic control routine 400 to estimate re-inducted residual gases and to determine engine fueling based thereon. The feed-forward dynamic control routine 400 including the equations can be reduced to executable algorithmic code that is installed and executed in a controller, e.g., controller 5 to control operation of an embodiment of the internal combustion engine 10 described with reference to FIG. 1. Residual gas residing in the intake port when operating the engine with the high-lift intake valve profile in the SI combustion mode can be dynamically modeled employing the following assumptions: i) all residual gas is burned, and ii) heat transfer between the residual gas and the cylinder wall is sufficiently small. When the engine operated with wide-open-throttle condition, the cylinder volume occupied by the residual gas at BDC is approximated by the sum of the geometrical cylinder volume at exhaust valve closing, $V_{EVC}$, assuming that the exhaust valve and the intake valve do not overlap, and the residual gas volume pushed into the intake port at the previous engine cycle, $V_{res}$. When the intake valve closes after BDC, the residual gas volume pushed into the intake port over consecutive engine cycles can be expressed as $$V_{res}(k+1) = (V_{res}(k) + V_{EVC}(k)) \times \left(1 - \frac{V_{IVC}(k)}{V_c + V_d}\right), \quad [1]$$

wherein $V_{res}$ is the residual gas volume in the intake port, k is the engine cycle, $V_d$ is cylinder displacement volume, $V_c$ is clearance volume, i.e., the minimum volume formed in the cylinder at TDC, and $V_{IVC}$ is the cylinder volume at intake valve closing. The term k indicates the present engine cycle, and the term k+1 indicates the next engine cycle.

Fuel injection control is executed to achieve a desired air-fuel mixture in each combustion mode and during mode transitions. In SI mode with LIVC, a portion of fuel mass injected in the cylinder is pushed into the intake port and re-inducted in the next engine cycle. Thus, a fuel controller calculates and tracks the fuel mass in the cylinder to achieve the desired air-fuel mixture, i.e., a stoichiometric air-fuel mixture. To model the dynamics of fuel mass pushed in the intake port, the following assumptions are made: i) air-fuel mixture is homogeneous, and ii) fuel injection is completed before the piston reaches BDC. When the intake valve closes after BDC, the fuel mass that is pushed to the intake port, $m_f^p$, can then be expressed as follows:

$$m_f^p(k+1) = (m_f^p(k) + m_f(k)) \times \left(1 - \frac{V_{IVC}(k)}{V_c + V_d}\right), \quad [2]$$

wherein $m_f$ is the fuel mass injected in the cylinder. The term k indicates the present engine cycle, and the term k+1 indicates the next engine cycle.

In SI mode, a stoichiometric air-fuel mixture is desired at BDC before backflow occurs, so that a stoichiometric cylinder charge is guaranteed at intake valve closing.

The fuel mass that achieves a desired air-fuel mixture can then be calculated as follows:

$$m_f(k) = \frac{1}{\lambda_s} \times MAP \times \left(\frac{V_c + V_d - V_{res}(k) - V_{EVC}(k)}{RT_{in}}\right) - m_f^p(k) \quad [3]$$

wherein MAP is the intake manifold pressure, R is the ideal gas constant, $T_{in}$ is intake air temperature, and $\lambda_s$ is the desired air/fuel ratio. The term k indicates the present engine cycle.

The feed-forward dynamic control routine 400 is reduced to executable code and operates as follows. During each cylinder event, intake and exhaust valve timings (402), and a geometrical cylinder volume at the exhaust valve closing (406) are determined based upon the intake and exhaust valve timings (402), and the cylinder volume at BDC (404) is determined. The intake and exhaust valve timings (402) are employed to determine a ratio of a backflow volume relative to the cylinder volume at BDC (408).

The residual gas volume trapped in the present cylinder event at the exhaust valve closing (406) is added (411) to a residual gas volume pushed into the intake port at the previous cylinder event that has been calculated by multiplying the residual gas volume at BDC at the previous cylinder event by the ratio of effective backflow volume relative to the cylinder volume at BDC (413) and stored in a memory device (415). This value is subtracted (417) from a difference between the cylinder volume at BDC (404) and the residual gas volume trapped at the exhaust valve closing in the present cylinder event (406) to determine the cylinder volume filled with fresh air at BDC (412). The cylinder volume filled with fresh intake charge at BDC (412) is combined with intake air parameters including pressure and temperature to determine a fresh air mass in the cylinder at BDC (421), which is combined with a desired air/fuel ratio (423) to determine an initial fuel command 424. The present amount of fuel in the intake port that has been pushed at the previous cylinder event, i.e., output from (427) which is currently stored in a memory device and is subtracted from the initial fuel command 424 (429) to determine a final mass fuel command 430, which corresponds to the fuel command calculated using EQ. 3. The initial fuel command 424 is multiplied by the ratio of an effective backflow volume relative to the cylinder volume at BDC (408) (425) to determine an amount of fuel that will be pushed into the intake port at the present engine cycles (426), which corresponds to the result calculated employing EQ. 2. This is subjected to the delay by storing in memory (427) for the next cylinder event.

Thus, a fuel control strategy is developed to manage fuel injection during a mode transition with a specifically designed cam that aligns high-lift and low-lift valve profiles such that cylinder air charge deviation before and after a valve profile switching can be minimized.

Figure 5:
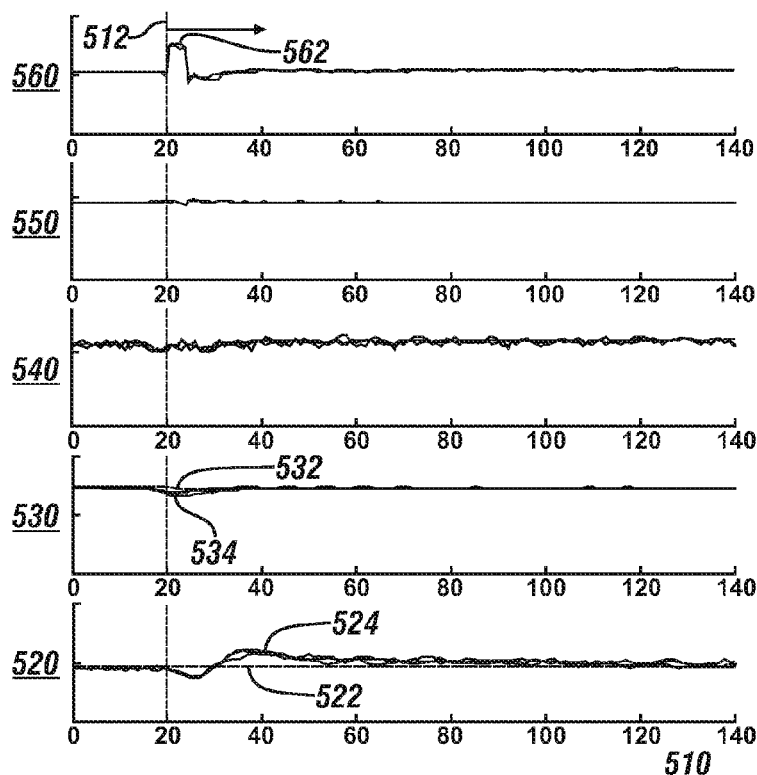
FIG. 5 graphically shows experimental results related to operation of an embodiment of the engine described with reference to FIG. 1 employing a controller executing an embodiment of the feed-forward dynamic control routine described with reference to FIG. 4 during a mode transition from HCCI to SI combustion modes, in accordance with the present disclosure.

FIG. 5 shows experimental results related to operation of an embodiment of the engine 10 described with reference to FIG. 1 employing a controller executing an embodiment of the feed-forward dynamic control routine 400 described with reference to FIG. 4 during a mode transition from the HCCI combustion mode to the SI combustion mode, including exhaust air/fuel ratio 520, cylinder air charge (g/event) 530, torque or NMEP (bar) 540, load or MAP(kPa) 550 and fuel mass ($m_f$,mg) 560, all shown in relation to engine events 510. Plotted data includes a desired air/fuel ratio 522, an actual air/fuel ratio 524, a desired cylinder air charge 532 and an actual cylinder air charge 534. Initially, the engine 10 is operating in the HCCI combustion mode, and is commanded to transition to the SI combustion mode starting at timepoint 512. As such, the control routine 400 executes a short term increase in engine fueling (562) during the period when the intake valves 20 and exhaust valves 18 are transitioned from low-lift profiles to high-lift profiles. The cylinder air charge 530, NMEP 540 and MAP 550 are unaffected during the transition.

Figure 6:
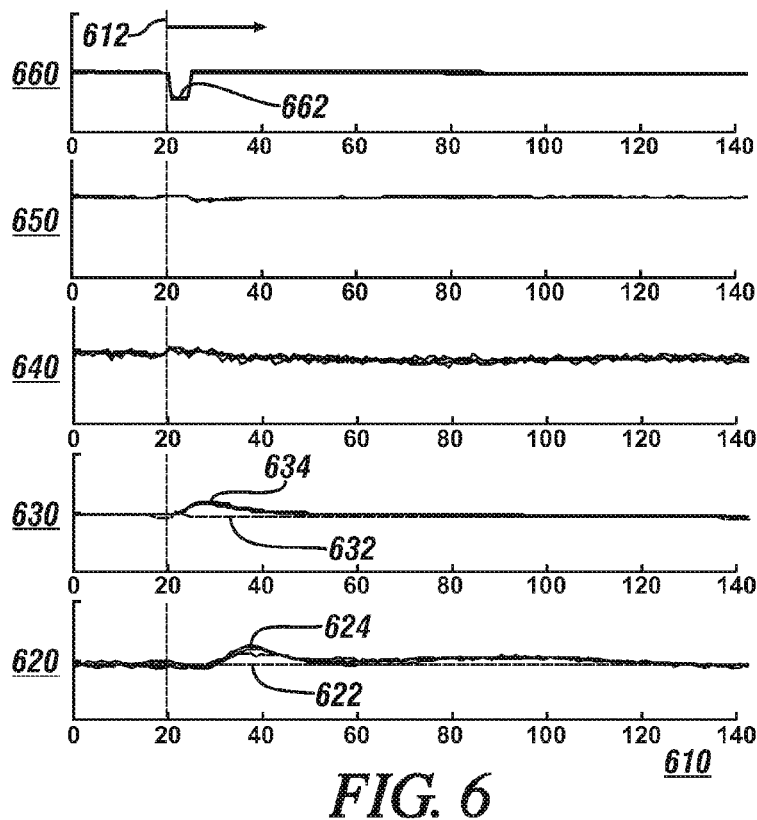
FIG. 6 graphically shows experimental results related to operation of an embodiment of the engine described with reference to FIG. 1 employing a controller executing an embodiment of the feed-forward dynamic control routine described with reference to FIG. 4 during a mode transition from SI to HCCI combustion modes, in accordance with the present disclosure.

FIG. 6 shows experimental data related to operation of an embodiment of the engine 10 described with reference to FIG. 1 employing an embodiment of the feed-forward dynamic control routine 400 described with reference to FIG. 4 during a mode transition from the SI combustion mode to the HCCI combustion mode, including exhaust air/fuel ratio 620, cylinder air charge (g/event) 630, torque or NMEP (bar) 640, load or MAP(kPa) 650 and fuel mass ($m_f$,mg) 660, all shown in relation to engine events 610. Plotted data includes a desired air/fuel ratio 622, an actual air/fuel ratio 624, a desired cylinder air charge 632 and an actual cylinder air charge 634. Initially, the engine 10 is operating in the SI combustion mode, and is commanded to transition to the HCCI combustion mode starting at timepoint 612. As such, the control routine 400 executes a short term decrease in engine fueling (662) during the period when the intake valves 20 and exhaust valves 18 are transitioned from high-lift profiles to low-lift profiles. The results indicate that the feed-forward dynamic control routine 400 successfully achieves mode transitions and HCCI combustion seamlessly after the intake and exhaust valve profiles were switched to low-lift profiles. The cylinder air charge and air/fuel ratio show slight deviations from the desired during the mode transitions mainly due to the slow cam phaser and uncertainty in volumetric efficiency. However, the deviation is promptly compensated by the controller executing engine control in accordance with the concepts described herein including the feed-forward dynamic model 400 to estimate re-inducted residual gases and to determine engine fueling based thereon.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for operating an internal combustion engine during a transition between operating in a homogeneous charge combustion mode and operating in a spark-ignition combustion mode employing late intake valve closing, comprising:
   determining an amount of residual gas re-inducted into a combustion chamber from a previous engine cycle;
   determining an amount of fresh air trapped in the combustion chamber for the present engine cycle based upon the amount of residual gas re-inducted into the combustion chamber from the previous engine cycle; and
   controlling, by a controller, engine fueling to the cylinder for the present engine cycle based upon the amount of fresh air trapped in the combustion chamber for the present engine cycle.

2. The method of claim 1, wherein operating the internal combustion engine in the spark-ignition combustion mode employing late intake valve closing comprises operating the internal combustion engine with the intake valve closing after bottom-dead-center (BDC), and wherein determining the amount of residual gas re-inducted into the combustion chamber from the previous engine cycle comprises determining an amount of residual gas pushed back into an intake port of the combustion chamber with the intake valve closing after BDC and determining an amount of residual gas trapped in the combustion chamber from the previous engine cycle.

3. The method of claim 2, wherein determining the amount of residual gas pushed back into the intake port of the combustion chamber with the intake valve closing after BDC and determining the amount of residual gas trapped in the combustion chamber from the previous engine cycle comprises:

determining a cylinder volume at exhaust valve closing when the exhaust valve and the intake valve do not overlap; and determining a residual gas volume pushed back into the intake port over consecutive engine cycles in accordance with $$V_{res}(k+1) = (V_{res}(k) + V_{EVC}(k)) \times \left(1 - \frac{V_{IVC}(k)}{V_c + V_d}\right),$$

wherein
$V_{EVC}$ is the cylinder volume at exhaust valve closing,
$V_{res}$ is the residual gas volume pushed back into the intake port,
k indicates the present engine cycle,
k+1 indicates the next engine cycle,
$V_c$ is a clearance volume,
$V_d$ is a cylinder displacement volume, and
$V_{IVC}$ is the cylinder volume at intake valve closing.

4. The method of claim 1, further comprising determining an amount of fuel pushed back into an intake port during the previous engine cycle, and
wherein controlling engine fueling to the cylinder for the present engine cycle based upon the amount of fresh air trapped in the combustion chamber for the present engine cycle comprises controlling engine fueling to the cylinder for the present engine cycle based upon the amount of fresh air trapped in the combustion chamber for the present engine cycle and the amount of fuel pushed back into the intake port during the previous engine cycle.

5. The method of claim 4, wherein determining the amount of fuel pushed back into the intake port during the previous engine cycle comprises determining the amount of fuel pushed back into the intake port during the previous engine cycle in accordance with $$m_f^P(k+1) = (m_f^P(k) + m_f(k)) \times \left(1 - \frac{V_{IVC}(k)}{V_c + V_d}\right)'$$

wherein
$m_f$ is the fuel mass injected in the cylinder,
$m_f^P$ is the amount of fuel that is pushed back into the intake port,
$V_c$ is a clearance volume,
$V_d$ is a cylinder displacement volume,
$V_{IVC}$ is the cylinder volume at intake valve closing,
k indicates the present engine cycle, and
k+1 indicates the next engine cycle.

6. A method for operating an internal combustion engine during a transition between operating in a homogeneous charge combustion mode and operating in a spark-ignition combustion mode employing late intake valve closing, comprising:
determining an amount of residual gas re-inducted into a combustion chamber from a previous engine cycle;
determining an amount of fuel pushed back into an intake port during the previous engine cycle; and
controlling, by a controller, engine fueling to the cylinder for the present engine cycle based upon the amount of fresh air trapped in the combustion chamber for the present engine cycle and the amount of fuel pushed back into the intake port during the previous engine cycle.

7. The method of claim 6, wherein determining the amount of fuel pushed back into the intake port during the previous engine cycle comprises determining the amount of fuel pushed back into the intake port during the previous engine cycle in accordance with $$m_f^P(k+1) = (m_f^P(k) + m_f(k)) \times \left(1 - \frac{V_{IVC}(k)}{V_c + V_d}\right)'$$

wherein
$m_f$ is the fuel mass injected in the cylinder,
$m_f^P$ is the amount of fuel that is pushed back into the intake port,
$V_c$ is a clearance volume,
$V_d$ is a cylinder displacement volume,
$V_{IVC}$ is the cylinder volume at intake valve closing,
k indicates the present engine cycle, and
k+1 indicates the next engine cycle.

8. A multi-cylinder direct-injection four-stroke internal combustion engine, comprising:
intake valves operatively connected to an intake camshaft for controlling air flow into each combustion chamber;
exhaust valves operatively connected to an exhaust camshaft for controlling exhaust flow from each combustion chamber;
an intake variable cam phasing and variable lift control device;
an exhaust variable cam phasing and variable lift control device;
the engine configured to operate in a late intake valve closing (LIVC) mode including controlling the intake variable cam phasing and variable lift control device at a high-lift intake valve profile and shifted such that the intake valves close after bottom-dead-center when the engine is operating in a spark-ignition combustion mode; and
a controller executing a control routine during a transition between operating the engine in a homogeneous charge combustion mode and operating the engine in the spark-ignition combustion mode employing late intake valve closing, the method including:
determining an amount of residual gas re-inducted into each combustion chamber from a previous engine cycle,
determining an amount of fresh air trapped in each combustion chamber for the present engine cycle based upon the amount of residual gas re-inducted into the combustion chamber from the previous engine cycle, and
controlling engine fueling to the cylinder for the present engine cycle based upon the amount of fresh air trapped in the combustion chamber for the present engine cycle.

9. The engine of claim 8, wherein the controller determining the amount of residual gas re-inducted into the combustion chamber from the previous engine cycle comprises the controller determining an amount of residual gas pushed back into an intake port of the combustion chamber with the intake valve closing after bottom-dead-center (BDC) and determining an amount of residual gas trapped in the combustion chamber from the previous engine cycle.

10. The engine of claim 9, wherein the controller determining the amount of residual gas pushed back into the intake port of the combustion chamber with the intake valve closing after BDC and determining the amount of residual gas trapped in the combustion chamber from the previous engine cycle comprises the controller:
  determining a cylinder volume at exhaust valve closing when the exhaust valve and the intake valve do not overlap; and
  determining a residual gas volume pushed back into the intake port over consecutive engine cycles in accordance with $$V_{res}(k+1) = (V_{res}(k) + V_{EVC}(k)) \times \left(1 - \frac{V_{IVC}(k)}{V_c + V_d}\right),$$

wherein
  $V_{EVC}$ is the cylinder volume at exhaust valve closing,
  $V_{res}$ is the residual gas volume pushed back into the intake port,
  k indicates the present engine cycle,
  k+1 indicates the next engine cycle,
  $V_c$ is a clearance volume,
  $V_d$ is a cylinder displacement volume, and
  $V_{IVC}$ is the cylinder volume at intake valve closing.

11. The engine of claim 8, further comprising determining an amount of fuel pushed back into an intake port during the previous engine cycle, and
  wherein the controller controlling engine fueling to the cylinder for the present engine cycle based upon the amount of fresh air trapped in the combustion chamber for the present engine cycle comprises the controller controlling engine fueling to the cylinder for the present engine cycle based upon the amount of fresh air trapped in the combustion chamber for the present engine cycle and the amount of fuel pushed back into the intake port during the previous engine cycle.

12. The engine of claim 11, wherein the controller determining the amount of fuel pushed back into the intake port during the previous engine cycle comprises the controller determining the amount of fuel pushed back into the intake port during the previous engine cycle in accordance with $$m_f^p(k+1) = (m_f^p(k) + m_f(k)) \times \left(1 - \frac{V_{IVC}(k)}{V_c + V_d}\right)',$$

wherein
  $m_f$ is the fuel mass injected in the cylinder,
  $m_f^p$ is the amount of fuel that is pushed back into the intake port,
  $V_c$ is a clearance volume,
  $V_d$ is a cylinder displacement volume,
  $V_{IVC}$ is the cylinder volume at intake valve closing,
  k indicates the present engine cycle, and
  k+1 indicates the next engine cycle.

* * * * *

UNITED STATES PATENT AND TRADEMARK OFFICE
CERTIFICATE OF CORRECTION

PATENT NO. : 9,664,135 B2  
APPLICATION NO. : 14/735547  
DATED : May 30, 2017  
INVENTOR(S) : Jun-Mo Kang et al.

Page 1 of 3

It is certified that error appears in the above-identified patent and that said Letters Patent is hereby corrected as shown below:

In the Claims

Column 10, Line 36, in Claim 1, "charge combustion mode" should read --charge compression ignition combustion mode--.

Column 10, Line 39, in Claim 1, "determining an amount of residual gas re-inducted into a combustion chamber from a previous engine cycle;" should read --during the transition between operating in the homogeneous charge compression ignition combustion mode and operating in the spark-ignition combustion mode, determining an amount of residual gas re-inducted into a combustion chamber from a previous engine cycle;--.

Column 10, Line 42, in Claim 1, "the" should read --a--.

Column 10, Line 46, in Claim 1, "the" should read --a--.

Column 11, Line 18, in Claim 3, "the" should read --a--.

Column 11, Line 21, in Claim 3, "is the cylinder" should read --is cylinder--.

Column 11, Line 45, in Claim 5, "is the fuel mass" should read --is fuel mass--.

Column 11, Line 50, in Claim 5, "is the cylinder" should read --is cylinder--.

Column 11, Line 52, in Claim 5, "indicates the next" should read --indicates a next--.

Column 11, Line 55, in Claim 6, "charge combustion mode" should read --charge compression ignition--.

Signed and Sealed this  
Thirty-first Day of October, 2017

Joseph Matal  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 9,664,135 B2

Column 11, Line 58, in Claim 6, "determining an amount of residual gas re-inducted into a combustion chamber from a previous engine cycle;" should read --during the transition between operating in the homogeneous charge compression ignition combustion mode and operating in the spark-ignition combustion mode, determining an amount of residual gas re-inducted into a combustion chamber from a previous engine cycle;--.

Column 11, Line 62, in Claim 6, "the" should read --a--.

Column 11, Line 63, in Claim 6, "the" should read --a--.

Column 11, Line 63, in Claim 6, "the" should read --an--.

Column 12, Line 13, in Claim 7, "is the fuel mass" should read --is fuel mass--.

Column 12, Line 18, in Claim 7, "is the cylinder" should read --is cylinder--.

Column 12, Line 20, in Claim 7, "the" should read --a--.

Column 12, Line 24, in Claim 8, "each combustion chamber" should read --each of a plurality of combustion chambers;--.

Column 12, Line 26, in Claim 8, "from each combustion chamber" should read --from each of the combustion chambers;--.

Column 12, Line 40, in Claim 8, "homogeneous charge combustion mode" should read --homogeneous charge compression ignition combustion mode--.

Column 12, Line 43, in Claim 8, "the method including:" should read --the control routine including:--.

Column 12, Line 44, in Claim 8, "into each combustion chamber" should read --into each of the combustion chambers--.

Column 12, Line 47, in Claim 8, "in each combustion chamber for the" should read --in each of the combustion chambers for a--.

Column 12, Line 49, in Claim 8, "into the combustion chamber" should read --into a corresponding combustion chamber--.

Column 12, Line 52, in Claim 8, "the" should read --a--.

Column 12, Line 53, in Claim 8, "air trapped in the combustion chamber" should read --into the corresponding combustion chamber--.

Column 12, Line 57, in Claim 9, "into the combustion chamber" should read --into the corresponding combustion chamber--.

CERTIFICATE OF CORRECTION (continued)
U.S. Pat. No. 9,664,135 B2

Column 12, Line 61, in Claim 9, "the" should read --a--.

Column 13, Line 20, in Claim 10, "the" should read --a--.

Column 13, Line 23, in Claim 10, "the" should read --a--.

Column 14, Line 19, in Claim 12, "is the fuel mass" should read --is fuel mass--.

Column 14, Line 24, in Claim 12, "the" should read --a--.

Column 14, Line 26, in Claim 12, "the" should read --a--.